(12) United States Patent
Bond et al.

(10) Patent No.: US 10,798,935 B2
(45) Date of Patent: Oct. 13, 2020

(54) TRAPS, TRAPPING SYSTEMS AND METHODS

(71) Applicant: GOODNATURE LIMITED, Wellington (NZ)

(72) Inventors: Craig Richard Bond, Wellington (NZ); Robert Blair Van Dam, Wellington (NZ); Stuart William Barr, Wellington (NZ)

(73) Assignee: GOODNATURE LIMITED, Newtown, Wellington (NZ)

( * ) Notice: Subject to any disclaimer, the term of this patent is extended or adjusted under 35 U.S.C. 154(b) by 605 days.

(21) Appl. No.: 15/054,621

(22) Filed: Feb. 26, 2016

(65) Prior Publication Data
US 2016/0249599 A1 Sep. 1, 2016

(30) Foreign Application Priority Data
Feb. 27, 2015 (NZ) ........................................ 705536

(51) Int. Cl.
*A01M 23/00* (2006.01)
*A01M 23/34* (2006.01)
*B64D 1/02* (2006.01)
*A01M 23/26* (2006.01)

(52) U.S. Cl.
CPC .......... *A01M 23/00* (2013.01); *A01M 23/265* (2013.01); *A01M 23/34* (2013.01); *B64D 1/02* (2013.01)

(58) Field of Classification Search
CPC .............................. A01M 23/00; A01M 23/34
USPC .................................................. 43/85, 86, 87
See application file for complete search history.

(56) References Cited

U.S. PATENT DOCUMENTS

| 883,611 | A | * | 3/1908 | Barad et al. | .......... | A01M 23/34 43/85 |
| 3,342,439 | A | * | 9/1967 | Behrendt | ................. | B64D 1/02 244/138 R |
| 3,755,958 | A | * | 9/1973 | Bradshaw | ............... | A01M 1/02 43/114 |
| 4,027,420 | A | * | 6/1977 | McKibben | ........... | A01M 1/2011 43/124 |
| 4,133,137 | A | * | 1/1979 | van Adelsberg | ........ | A01M 1/02 229/116 |

(Continued)

FOREIGN PATENT DOCUMENTS

| CA | 2068287 A1 | 11/1993 |
| EP | 0034426 | 8/1981 |

(Continued)

OTHER PUBLICATIONS

European Search report dated Jul. 4, 2016.

*Primary Examiner* — David J Parsley
(74) *Attorney, Agent, or Firm* — Thomas Coester Intellectual Property

(57) ABSTRACT

An animal trap includes: a bait, a support, and an elastic band, wherein in a set state the support supports the elastic band in an expanded state, and wherein removal, consumption or destruction of the bait by an animal: causes the elastic band to contract around the animal to kill the animal; or causes the elastic band to drive a kill mechanism to kill the animal. Animal traps may be formed substantially or entirely of biodegradable materials. Animal traps may be adapted for aerial distribution. A trap dispenser may dispense traps as they are triggered.

14 Claims, 14 Drawing Sheets

(56) References Cited

U.S. PATENT DOCUMENTS

| | | | | |
|---|---|---|---|---|
| 4,403,438 A | * | 9/1983 | West-Harron | A01M 23/30 43/81 |
| 4,569,149 A | | 2/1986 | Sensing | |
| 4,918,855 A | | 4/1990 | Simpson | |
| 5,177,896 A | | 1/1993 | Miyasaki | |
| 5,259,152 A | | 11/1993 | Calfee | |
| 5,706,601 A | * | 1/1998 | Dail | A01M 23/30 43/81 |
| 5,813,165 A | * | 9/1998 | Dougherty, Sr. | A01M 23/34 43/42.06 |
| 6,029,393 A | * | 2/2000 | Stewart | A01M 23/16 43/58 |
| 7,076,914 B1 | * | 7/2006 | Howse | A01M 1/02 43/124 |
| 7,171,777 B2 | * | 2/2007 | Welin-Berger | A01M 23/16 43/85 |
| 7,918,050 B2 | * | 4/2011 | Sturgeon | A01M 23/34 43/85 |
| 9,730,438 B2 | * | 8/2017 | Messaros | A01M 25/006 |
| 2009/0282727 A1 | * | 11/2009 | Bell | A01M 23/30 43/85 |
| 2015/0128482 A1 | * | 5/2015 | Moreto | A01M 17/00 43/132.1 |

FOREIGN PATENT DOCUMENTS

| | | |
|---|---|---|
| EP | 1906728 | 3/2017 |
| JP | 2001333683 A | 12/2001 |
| JP | 4990894 | 5/2012 |
| NZ | 529970 A | 12/2006 |
| WO | 2005/053392 | 6/2005 |
| WO | WO2011055217 A1 | 4/2013 |

* cited by examiner

US 10,798,935 B2

TRAPS, TRAPPING SYSTEMS AND METHODS

FIELD OF THE INVENTION

The invention relates to traps, trapping systems and methods.

BACKGROUND TO THE INVENTION

Traps are used to control various pests, including (in New Zealand) mice, rats, stoats, possums and ferrets. In other countries, other pests are of course present. Types of traps include leg-hold traps, live capture traps and kill-traps. Generally it is desirable for traps to be humane, environmentally friendly, long-lasting, and easy and inexpensive to manufacture.

A particular category of kill-traps kill pests by releasing resilient elastic bands around the pests (e.g. around the neck of the pests). Such traps are generally actuated by triggers, e.g. levers triggered when an animal moves towards the bait and brushes past the levers. Such traps are described in WO2005053392A1 and WO2013055237A1.

However such traps may be undesirably sensitive to triggering or too insensitive to triggering. Therefore there is a risk that animals which are not pests (e.g. birds), humans, or other objects may accidentally trigger the traps or that some target species may not trigger the traps.

Such traps may also fail to ensure that the pest is in the correct position to be killed when the elastic band is released. Ideally, the band will contract around the neck or lungs of the pests.

As the trigger mechanisms of conventional traps rely on pests actuating the trigger, it is possible for smaller pests to fail to trigger the trap while consuming the bait. This can leave the trap untriggered and ineffective as the bait is lost. It may be desirable to provide traps which are able to kill a wider range of animal types and ages.

In general, current traps are manually baited and set by a user. This is sometimes messy or fiddly and can be time consuming. Further, traps are generally manually distributed. For example, traps used in wilderness areas are usually carried by workers and manually distributed, baited and set. Trapping in remote areas carries a substantial cost in money and worker hours.

Reference to any prior art in this specification does not constitute an admission that such prior art forms part of the common general knowledge.

It is an object of the invention to provide an improved trap which overcomes or at least ameliorates some or all of the disadvantages of prior traps or to at least provide the public with a useful choice.

SUMMARY OF THE INVENTION

In a first aspect the invention provides a trap including: a bait, a support, and an elastic band, wherein in a set state the support supports the elastic band in an expanded state, and wherein removal, consumption or destruction of the bait by an animal: causes the elastic band to contract around the animal to kill the animal; or causes the elastic band to drive a kill mechanism to kill the animal.

In one embodiment removal, consumption or destruction of the bait by an animal allows the support to collapse, releasing the elastic from the expanded state.

Preferably, in a set state, the bait resists compression to maintain the support in a supporting position in which it supports the elastic band in the expanded state.

Preferably, in a set state, the bait resists expansion to maintain the support in a supporting position in which it supports the elastic band in the expanded state.

Preferably the support includes one or more pivoted arms secured at one end of each arm by the bait to maintain the support in a supporting position in which it supports the elastic band in the expanded state.

Preferably the bait is annular and the one or more pivoted arms hook through or around the bait.

In one embodiment removal, consumption or destruction of the bait by an animal urges the elastic band from the support.

Preferably the support includes a biasing element compressed or extended by the bait in a set state.

Preferably removal, consumption or destruction of the bait allows the biasing element to relax from the compressed or extended state, urging the elastic band from the support.

Preferably the trap includes a kill mechanism having two or more sections that are open in a set state and driven by the elastic ring to close when the trap is triggered by removal, consumption or destruction of the bait.

Preferably the bait is positioned within a housing.

Preferably the bait is supported at such a distance from the elastic band that the elastic band contracts around the animal to kill the animal when the trap is triggered by removal, consumption or destruction of the bait.

Preferably the trap is formed substantially or entirely of biodegradable materials.

Preferably the trap includes one or more drag-inducing features to assist aerial distribution and/or orientation.

In another aspect the invention provides a trap dispenser which sequentially dispenses traps as described above, as each trap is triggered.

In a further aspect the invention provides a trapping system including: a trap dispenser; a plurality of single kill animal traps arranged in the trap dispenser, each animal trap including a trigger mechanism and a kill mechanism, one of the plurality of animal traps being positioned in a trapping position in which it is accessible to animals; the dispenser and animal traps being arranged such that, when an animal trap in the trapping position is actuated by an animal it is released from the dispenser and a further one of the animal traps is dispensed to the trapping position.

Preferably each trap includes an attractant.

Preferably the dispenser includes a retention arrangement configured to retain a set trap in the trapping position.

Preferably the retention arrangement is arranged to release an actuated trap from the trapping position.

Preferably the release of the actuated trap is caused or assisted by a force applied to the actuated trap by a trapped animal.

Preferably each trap is configured to release itself from the retention arrangement when actuated.

Preferably each trap includes a retention element configured to cooperate with the retention arrangement when the trap is in the trapping position, and wherein the retention element is configured to withdraw when the trigger mechanism is actuated.

Preferably each trap within the dispenser is in a set state.

Preferably each trap is a trap according to the first aspect above.

In another aspect the invention provides a method of distributing animal traps, each in a set state and each including an attractant, a trigger mechanism and a kill mechanism, the method including distributing the animal traps by dropping or propelling each animal trap to a remote location at ground level.

Preferably each trap is configured to remain in a set state under shock loads imposed by landing at the remote location.

Preferably each trap is configured to be actuated when an animal consumes, removes or destroys the attractant.

Preferably the animal traps are distributed by dropping each animal trap from an aircraft.

Preferably the trap includes one or more drag-inducing features to assist aerial distribution and/or orientation.

In another aspect the invention provides an animal trap including an attractant, trigger mechanism and kill mechanism, the animal tap being formed substantially or entirely from biodegradable materials.

Preferably the kill mechanism includes or is powered by an elastic element made from biodegradable natural rubber.

Preferably the elastic element is an elastic ring.

Preferably at least part of the trap is formed from a biodegradable mouldable polymer material.

Preferably the biodegradable mouldable polymer material is derived from animal products.

BRIEF DESCRIPTION OF THE DRAWINGS

The invention will now be described by way of example only, with reference to the accompanying drawings, in which:

FIG. 1b shows a perspective view of the trap of FIG. 1a;

FIG. 2b shows a perspective view of the trap of FIG. 2a;

FIG. 3b shows a perspective view of the trap of FIG. 3a;

FIG. 4b shows a perspective view of the trap of FIG. 4a;

FIG. 5b shows a perspective view of the trap of FIG. 5a;

FIG. 6b shows a perspective view of the hopper of FIG. 6a;

FIG. 7b shows a perspective view of the hopper of FIG. 6a; and

FIG. 7c shows a detailed view of a part of the trap of FIG. 7a.

DETAILED DESCRIPTION

Figure 1A:
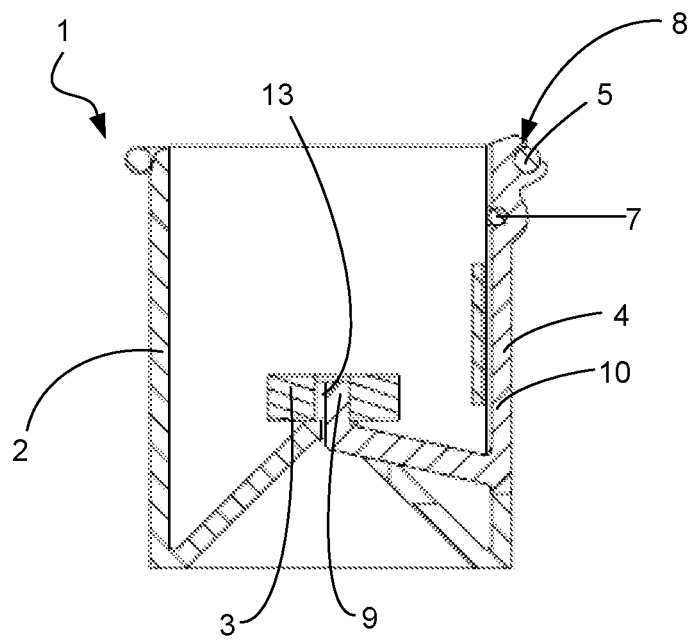
FIG. 1a shows a front cross sectional view of a trap in an unactivated or set state according to an embodiment of the invention.

The Applicant has realized that it would be advantageous to provide a trap suitable for distribution by aircraft and/or for automated dispensing from a trap dispenser. In some embodiments the Applicant's trap may be distributed freely from aircraft, with the traps distributed in a set state. The bait and trigger arrangement discussed below is robust and capable of withstanding the shock load or force of falling to the ground. This is expected to allow large numbers of traps to be distributed to remote areas without requiring individual workers to access those remote areas at ground level. Further, in some embodiments the Applicant's traps may be formed substantially, or preferably entirely from biodegradable materials. Thus, traps that have been set off and killed animals and traps that have not been triggered will break down over a period of time. The traps may therefore be well suited to use in remote conservation areas.

In other embodiments, the Applicant's traps may be arranged in a trap dispenser, such that a further single kill trap is dispensed to a trapping position as a first single kill trap is actuated to kill an animal. This is a new approach to multiple kill trapping systems. In prior systems, multiple kill traps have been proposed, one example being the Applicant's traps as disclosed in WO2010101481A1. The Applicant's dispenser dispenses an entire trap. I.e. the Applicant proposes a dispenser and multiple single kill traps, as opposed to prior systems using a single trap capable of multiple kills.

Further, the Applicant's traps may be used in domestic and other urban settings. The traps are designed to be assembled and set in the factory. The user therefore does not need to set the trap. The design of the trap housing, described below, allows convenient disposal of the trap and killed animal. A user does not need to release the killed animal from the trap, and can handle the trap housing without touching the killed animal.

FIGS. 1a-5d show various embodiments of traps for animals, in which the traps are triggered by consumption, removal and/or breaking of the bait by the animals. The embodiments include an elastic band or ring which is supported in an expanded state by some form of support when the traps are in an unactivated (set) state, but is allowed to contract around the animal to kill the animal when the trap is triggered. The animal may be killed by the elastic band impeding blood flow. The removal, consumption and/or breaking of the bait by animals may collapse the support for the elastic band which keeps the elastic band expanded. The bait may resist compression to maintain support for the elastic band, to keep it in an expanded state when the trap is set. Alternatively, the bait may resist expansion to maintain the support for the elastic band. In other embodiments, the removal, consumption and/or breaking of the bait by an animal may urge the elastic band off the support.

FIGS. 1a-1d shows a trap according to an embodiment the present invention.

Figure 1B:
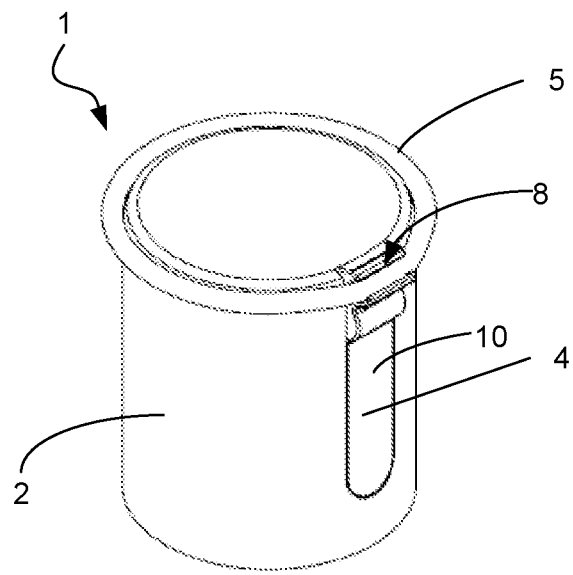

FIGS. 1a and 1b show a trap 1 in an unactivated state, meaning the trap is set and ready to be triggered by an animal. The trap 1 includes a housing 2, bait 3, a pivotable arm 4, and an elastic band 5. The bait 3 is located on a pin 13 inside the housing, near the closed end of the housing, such that an animal must partly enter the housing 2 to reach the bait 3. The arm 4 comprises a pivoted arm secured at a lower end of the arm by the bait. The upper end of the pivoted arm includes a recess 8 that retains a portion of the elastic band or ring 5. In an unactivated state, the arm 4 retains the elastic band 5 in an expanded state. As will be described in detail below, removal or consumption or destruction of the bait 3 by an animal releases the lower end of the arm, removing support of the elastic band so that the elastic band 5 contracts around the animal.

The rubber ring 5 may be formed from any suitable material capable of providing sufficient elastic force to kill the animal when released. Rubber rings such as those used in docking of lambs' tails in New Zealand may be used. The rubber rings may be formed from a natural rubber, such as latex, and may be biodegradable.

The arm 4 includes a recess 8 which secures a portion of the elastic band. The band 5 is wrapped around the rim of the upper part housing. This allows an animal to pass through the band 5 to reach the bait.

The arm 4 is pivoted about a pivot 7. The arm 4 includes a hook portion 9 at one end which is secured by the bait. The bait in this embodiment 3 is preferably annular, and the hook portion hooks within or through the aperture of the annular bait. The bait 3 secures the arm 4, such that a main portion 10 of the arm 4 is substantially parallel to or aligned with the walls of the housing 2 when the trap is unactivated/set. The housing 2 includes a slot 11 (FIG. 1c) of a slightly greater area than that of the arm, such that the arm 4 rests inside the slot when the trap is unactivated. The bait 3 resists the pivotal force of the arm 4 to maintain the elastic band in its extended position.

Figure 1C:
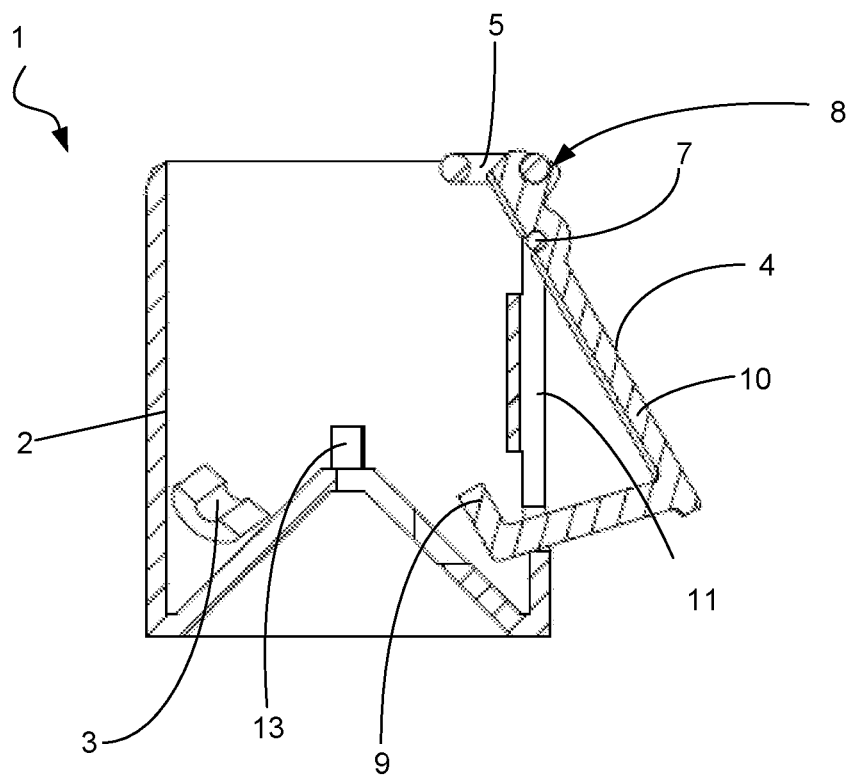
FIG. 1c shows a front cross sectional view of a trap in a triggered state according to an embodiment of the invention.
Figure 1D:
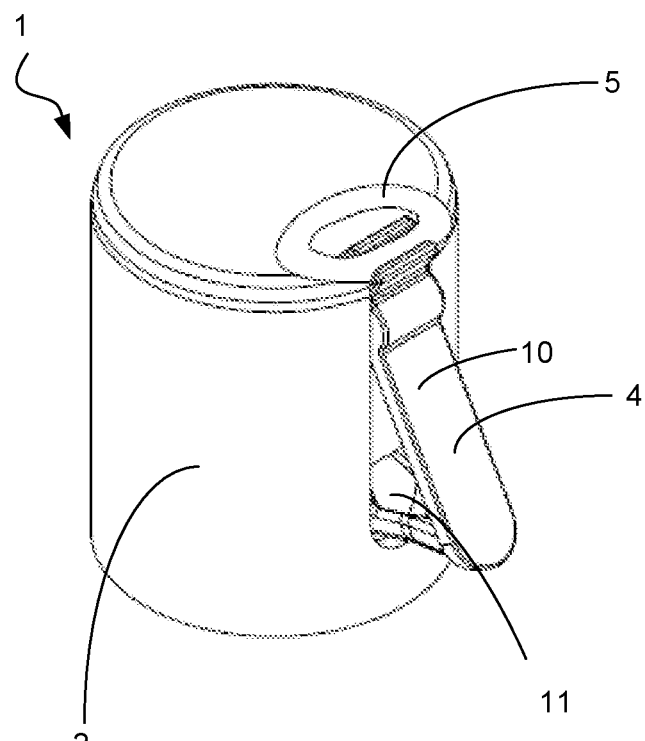
FIG. 1d shows a perspective view of the trap of FIG. 1c.

FIGS. 1c and 1d show a trap in a triggered state, once the bait 3 has been at least partly consumed, removed or destroyed. Without the bait 3 securing the arm 4, the pivoting arm 4 is biased by the band 5 to the pivoted position as shown in FIG. 1c. In other words, the pivoting arm is biased towards that position, but in an unactivated state the bait 3 overcomes that bias to keep the pivoting arm in the position shown in FIG. 1a. When the trap is triggered, the arm thus moves part of the band 5 away from the recess of the housing causing the band to slide off the recess. Therefore, removal or consumption or destruction of the bait 3 by an animal causes the band to be urged off the rim of the housing 2 as shown in FIG. 1d.

An animal attracted by the bait 3 would at least partially enter the housing 2 through the open end of the housing 2 (and thus through the elastic band 5 which surrounds the housing), to reach the bait. When the animal consumes, breaks or removes the bait, the bait 3 is no longer able to retain the pivoting arm against its natural bias, and thus the pivoting arm pivots to the tilted position, releasing the elastic band 5 from the outside of the housing, contracting it around the animal.

Although only one pivoted arm is shown in this embodiment, other embodiments are possible including further pivoted arms.

In the embodiment shown, the arm 4 continues to retain the band 5 when the trap is actuated, however in other embodiments, the arm 4 may be configured such as to completely release the elastic band. As will be discussed in more detail below, retaining a portion of the elastic band 5 may be useful for allowing traps to be sequentially released in a dispenser. This arrangement also allows disposal of the trap and killed animal in one operation.

The embodiment shown in FIGS. 1a-1d is one example of a trap in which removal or consumption of the bait 3 by an animal causes the band to be urged off the support, so that the elastic band 5 contracts around the animal. Any other suitable collapsible support arrangements are possible provided the bait 3 is arranged such that consumption of the bait 3 causes or allows the elastic ring to contract when the trap is triggered.

FIGS. 2a-2d show an embodiment of a trap wherein the arm 4 element includes two pivoting arms 26 and 27. The pivoting arms pivot about rods 20 and are biased towards the position shown in FIG. 2c by compressive forces exerted by band 5. The elastic band 5 is wrapped around the outside of the upper part of the housing. The pivoting arms include recesses 8, securing two portions of the elastic band 5 along the outside of the housing. The recesses 8 are outwardly facing when the trap is inactivated and the pivoting arms are generally vertical.

The pivoting arms are held approximately parallel to the walls of the housing 2 by the bait 3 when the trap is unactivated. The housing 2 includes slots 11 of a slightly greater area than that of the pivoting arms, such that the pivoting arms rest inside the slot when the trap is unactivated.

Inside the housing, the pivoting arms are connected by the bait 3 at each end of the bait. Thus the bait 3 holds the pivoting arms together against their natural bias when the trap is unactivated.

Figure 2A:
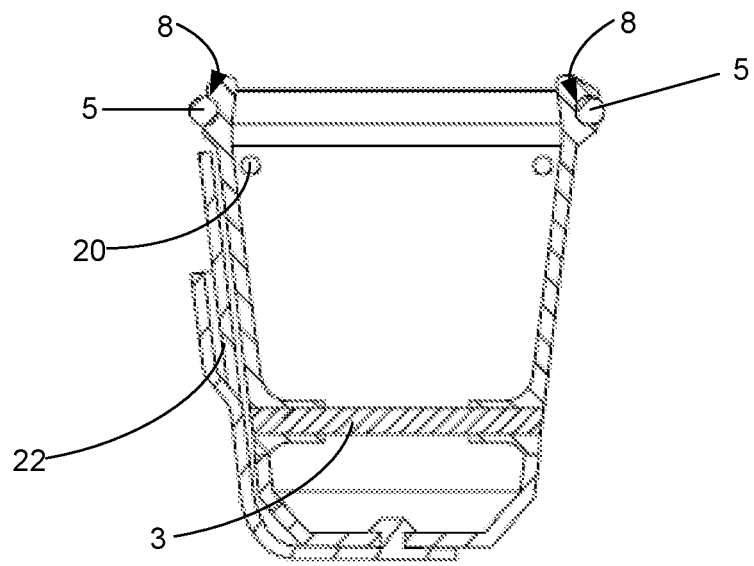
FIG. 2a shows a front cross sectional view of a trap in an unactivated state according to another embodiment of the invention.
Figure 2B:
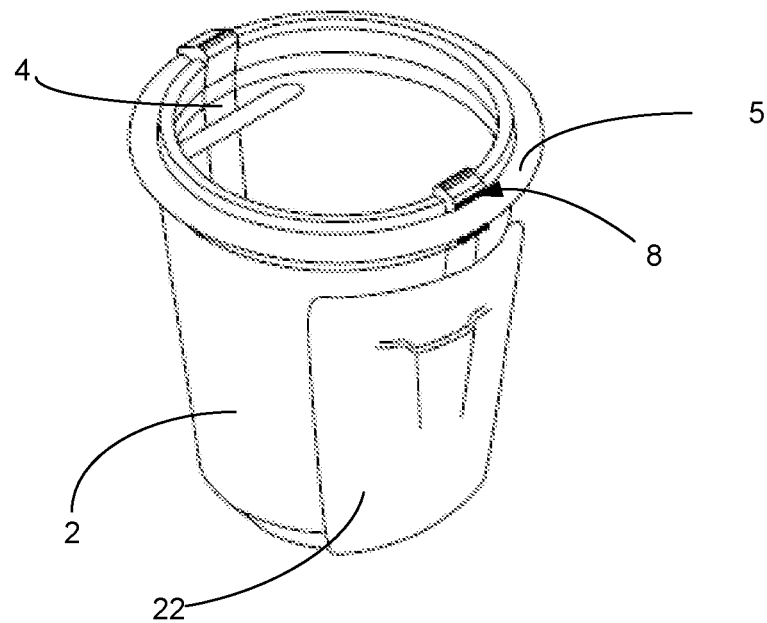
Figure 2C:
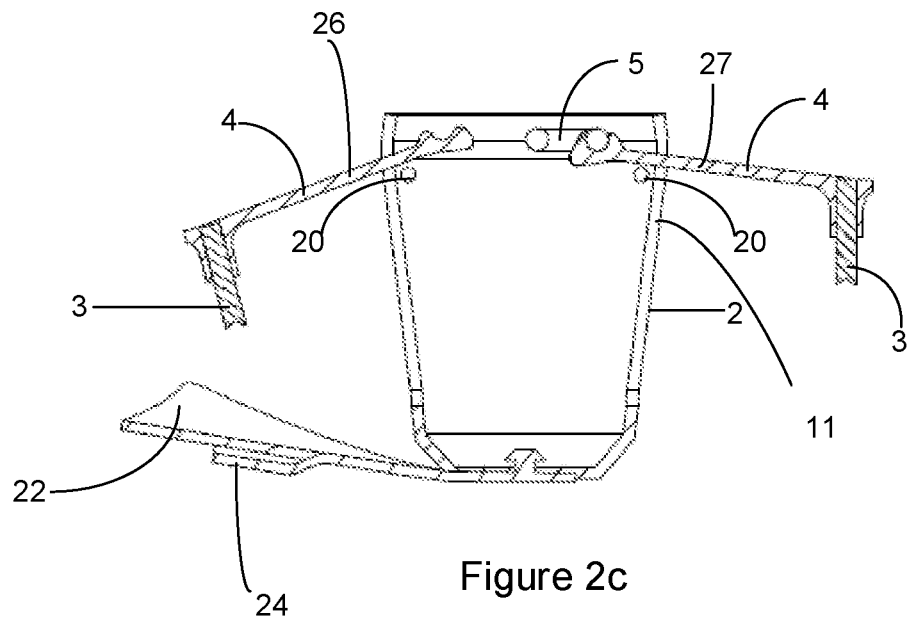
FIG. 2c shows a front cross sectional view of a trap in a triggered state according to an embodiment of the invention.
Figure 2D:
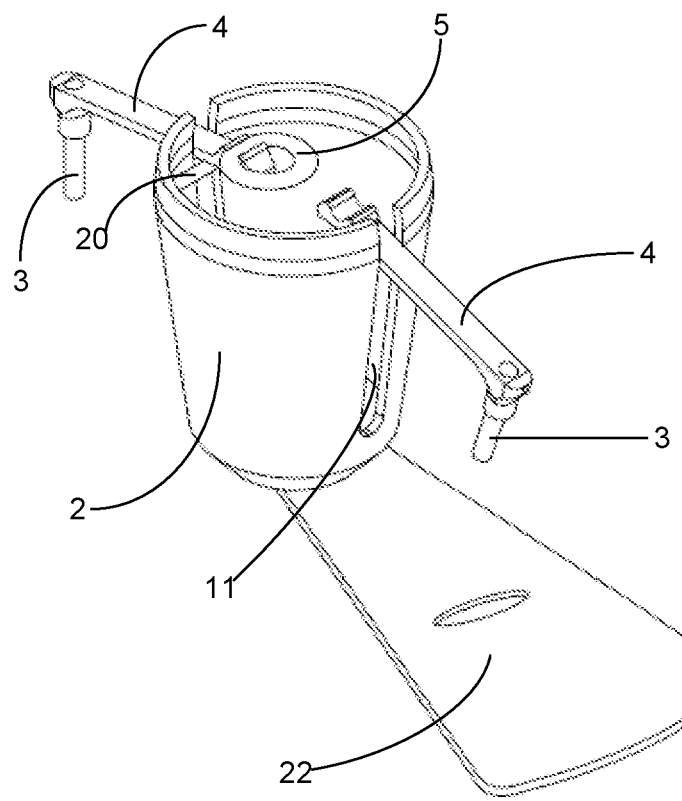
FIG. 2d shows a perspective view of the trap of FIG. 2c.

When an animal chews through or breaks the bait, the pivoting arms move to the positions they are biased towards in FIGS. 2c and 2d. As this happens, the pivoting arms 26 and 27 pivot towards a substantially horizontal position. The recesses securing portions of the elastic band 5 are now upwardly facing, which moves the band off the rim of the housing and allows release of the elastic band 5 around the animal.

The trap 1 also includes a drag device 22 in the form of a flap. As will be discussed later in the specification, this may assist aerial distribution of the trap.

In the example of FIGS. 2a-2d two pivot arms are provided, however the invention is not limited in this respect. Any suitable number of pivot arms may be provided. The arms may be symmetrically arranged around the housing, or they may be arranged in some other configuration.

FIGS. 3a-3d show an embodiment of a trap in which removal or consumption of the bait 3 by an animal urges the elastic band 5 from the support.

Figure 3A:
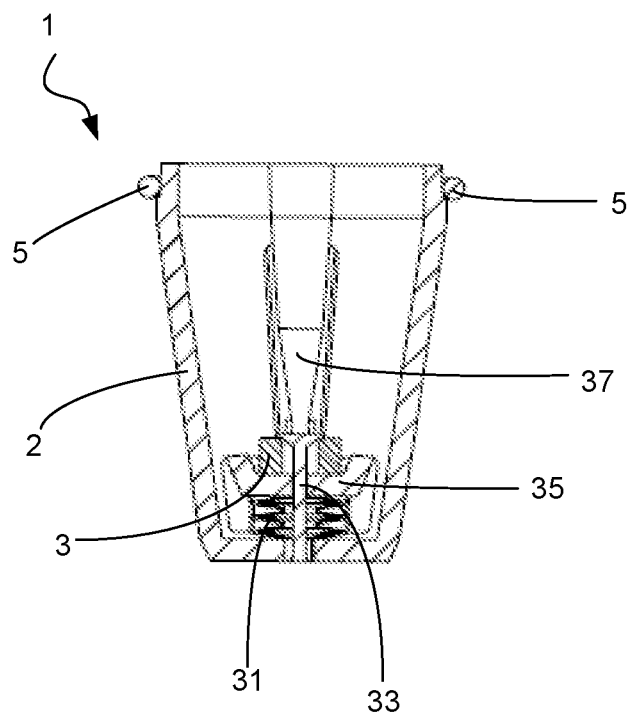
FIG. 3a shows a front cross sectional view of a trap in an unactivated state according to another embodiment of the invention.

The trap includes a biasing element, in this case a spring 31, which is compressed by the bait 3 in an unactivated state. A spacer 35 is mounted on the spring 31 and acts against the ends of three pivoting arms 37. The bait 3 is secured on top of the spring 31 and the support 35 by a fixed pin 33. The bait 3 therefore compresses the spring 31 as shown in FIG. 3a. When the bait 3 is consumed or removed or destroyed by an animal, the spring 31 extends, pushing the spacer 35 upwards relative to the base of the housing, which in turn forces arms 37 away from the base of the housing 2.

Figure 3B:
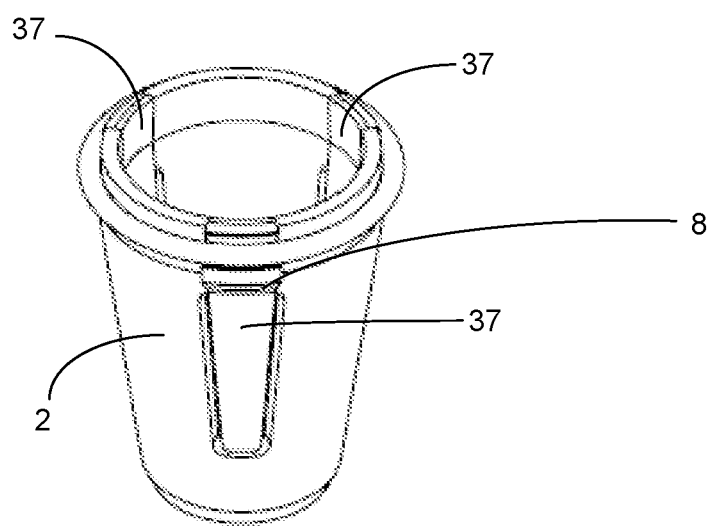
Figure 3C:
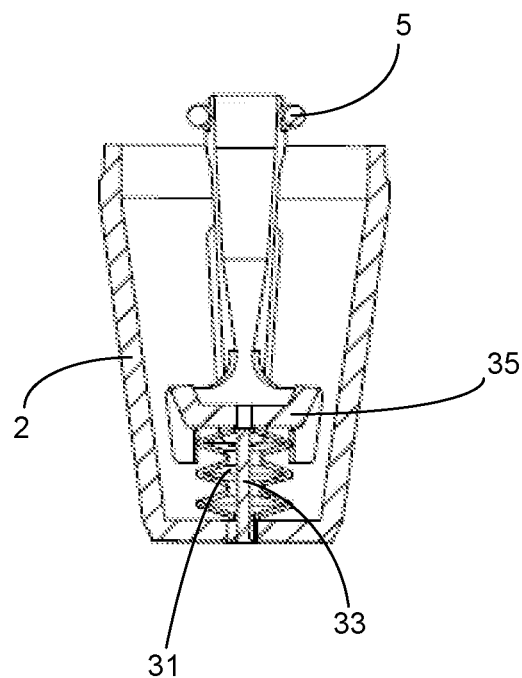
FIG. 3c shows a front cross sectional view of a trap in a triggered state according to an embodiment of the invention.
Figure 3D:
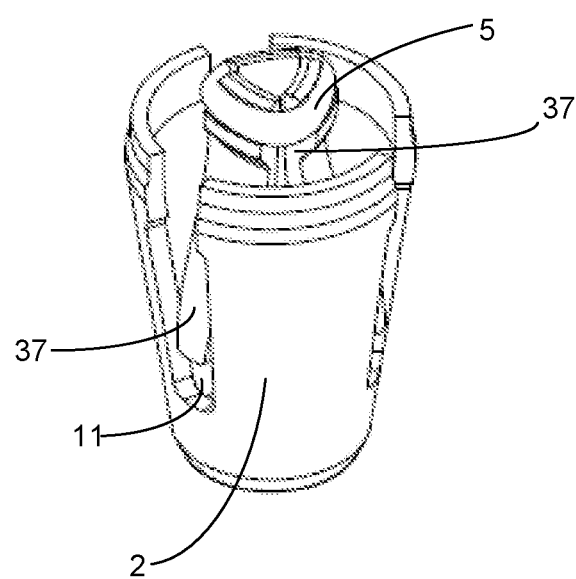
FIG. 3d shows a perspective view of the trap of FIG. 3c.

In an unactivated state, the three pivoting arms 37 are substantially aligned with the walls of the housing, as shown in FIGS. 3a and 3b. The walls of the housing 2 include cut-out slots in which the pivoting arms fit when the trap is unactivated.

The elastic band 5 is supported around the exterior of the housing, and by recesses 8 on the pivoting arms.

Removal or consumption or destruction of the bait 3 allows extension of the spring/biasing element, since the spring 31 is naturally biased towards an extended state. Extension of the spring 31 raises the spacer 35 carrying the three pivoting arms. As the three arms 37 carrying the elastic band 5 are pushed upwards relative to the housing, the elastic band 5 is released from the housing. The elastic band 5 is then only supported by the three pivoting arms. The resilience of the elastic band 5 causes the elastic band 5 to contract once the support 35 is at a height such that the elastic band 5 is free from the housing. The contraction of the elastic band 5 causes the three pivotable arms 37 to pivot inwards. When an animal is present, the three pivotable arms 37 pivot inwards, and the resilience/contracting force of the elastic band 5 kills the animal.

Thus the trap consists of two or more arms retained open in an unactivated state and closed when triggered by the removal or consumption of the bait.

Figure 4A:
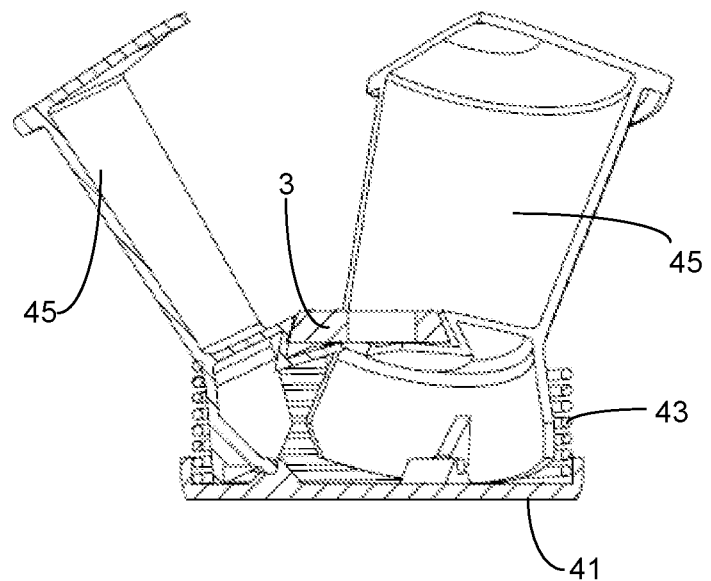
FIG. 4a shows a front cross sectional view of a trap in an unactivated state according to another embodiment of the invention.
Figure 4B:
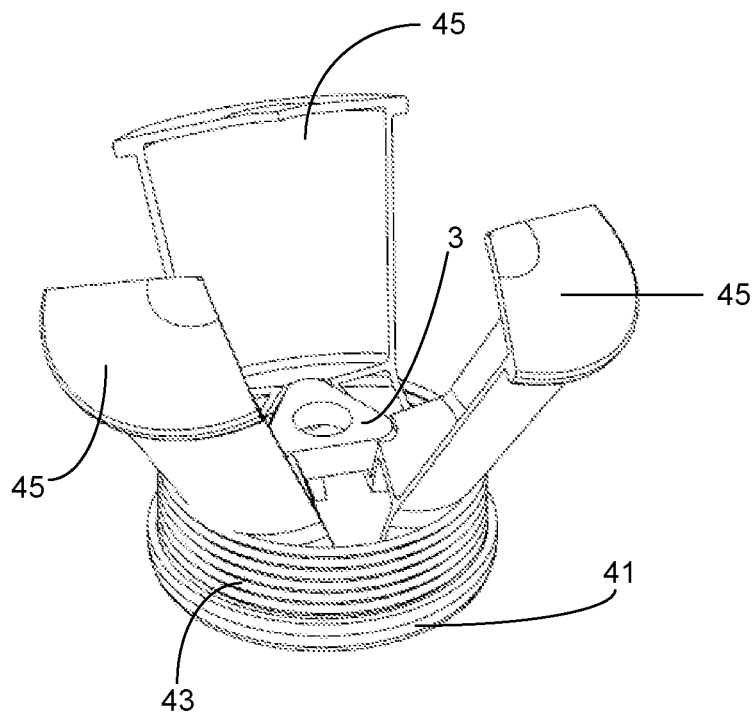

FIGS. 4a-4d show yet another embodiment of a trap. FIGS. 4a and 4b show the trap in an unactivated state. The three pivoting housing sections 45 are shown pivoted outwardly from the center of the housing. The trap includes a base 41 supporting three pivoting housing sections 45. The base is surrounded by a coil 43, which is compressed and coiled around the base.

Figure 4C:
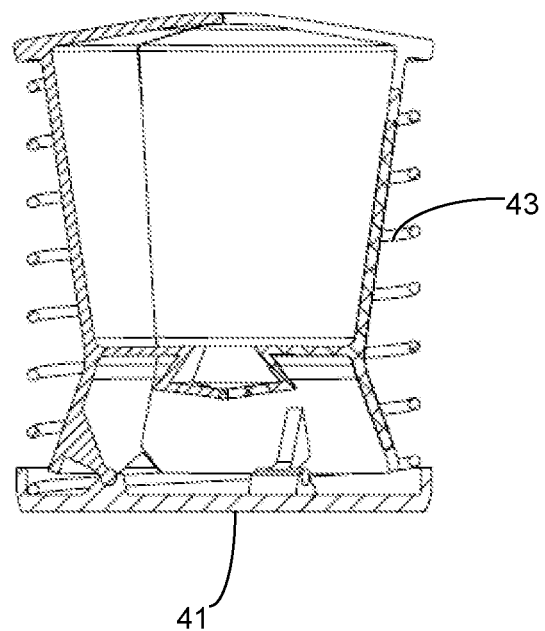
FIG. 4c shows a front cross sectional view of a trap in a triggered state according to an embodiment of the invention.
Figure 4D:
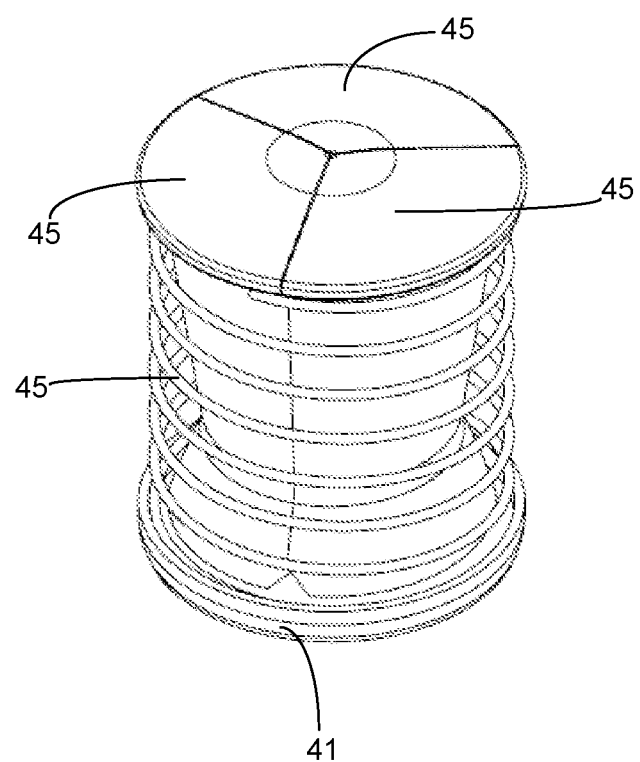
FIG. 4d shows a perspective view of the trap of FIG. 4c.

The pivoting housing sections are biased towards the position shown in FIGS. 4c and 4d, in which they form a completely enclosed housing. In an unactivated state the bait 3 is wedged between the three housing sections, just above the base. The pivoting housing sections are maintained in their pivoted position against the bias by the bait.

The coil is biased towards the position shown in FIGS. 4c and 4d. In an unactivated state the coil is maintained in a compressed state, by the pivoted housing sections 45 being pivoted outwardly, blocking the coil from expanding upwardly.

An animal is able to access the bait 3 between the three housing sections. When an animal consumes or removes the bait 3 there is no longer anything maintaining the three housing sections against their bias. The three housing sections thus collapse inwardly, as shown in FIGS. 4c and 4d, trapping and/or crushing the animal.

The inward pivoting of the three housing sections also allows the coil to extend in accordance with its bias, around the now-closed housing. This prevents the animal from re-opening the three housing sections to escape.

In other embodiments, any number of housing sections may be arranged in any suitable manner to crush and/or trap the animal.

The bait 3 shown in FIGS. 4a and 4b is annular, and triangular in shape, with the three corners of the bait 3 wedging against the three housing sections. The annular nature of the bait 3 makes it easier for an animal to break apart the bait 3 to collapse the housing 2 sections without needing to consume a large quantity of the bait 3. However, the invention is not limited in this respect and any suitable shape and/or configuration of the bait 3 may be possible.

FIGS. 5a-5d show another embodiment of a trap according to the present invention.

The trap includes a housing 2 and three arms 51. When the trap is in an unactivated state the arms are substantially aligned with the walls of the housing. The housing 2 includes three slots 52 of a slightly greater area than the area of the arms 51 such that the arms 51 fit within the slots when the trap is unactivated.

The arms 51 include slots 55 which guide the movement of the arms. The interior edge of the housing 2 at the side-wall of the slots include pins 54, configured to locate within the slots 55.

The elastic band 5 in this embodiment is stretched around the exterior of the housing, and retained by three clips 53 symmetrically arranged around the top part of the housing, and by three hooks 56 symmetrically arranged near the bottom part of the housing. The hooks are connected to lower part of the arms. The elastic band 5 zigzags between the hooks and the clips around the outside of the housing.

Figure 5A:
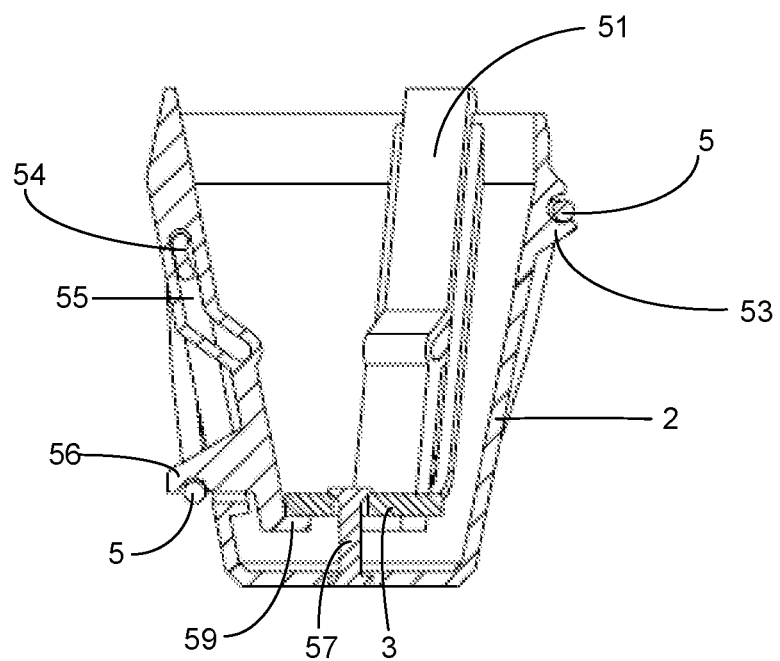
FIG. 5a shows a front cross sectional view of a trap in an unactivated state according to another embodiment of the invention.
Figure 5B:
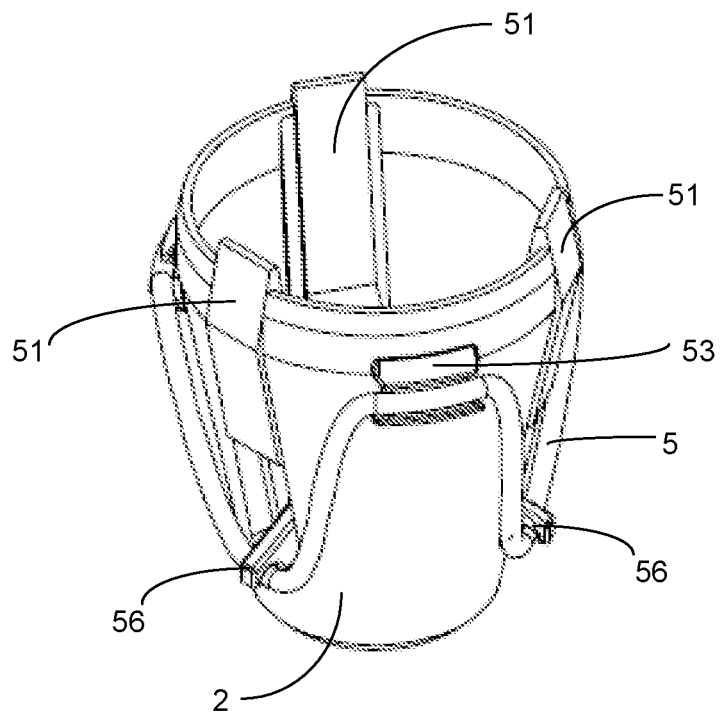

The portion of the elastic band 5 connected to the hooks are biased upwardly, however the bait 3 maintains the elastic bands and the arms 51 in the arrangement shown in FIGS. 5a and 5b. The bait 3 is supported around a pin 57 from the base of the housing. The bait 3 retains the arms 51 from moving away from the base of the housing. A foot 59 of the arm is retained underneath the bait.

Figure 5C:
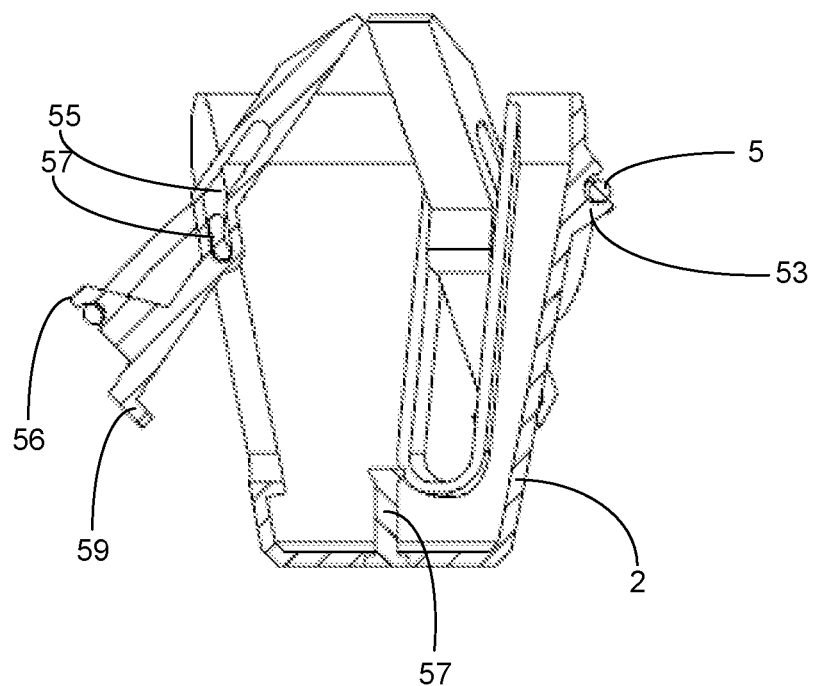
FIG. 5c shows a front cross sectional view of a trap in a triggered state according to an embodiment of the invention.
Figure 5D:
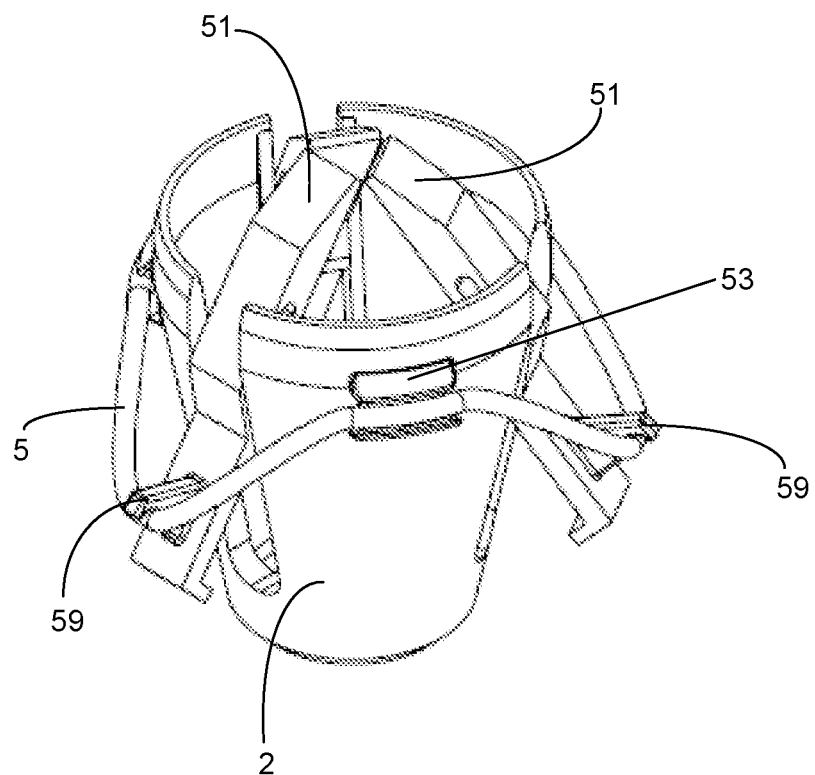
FIG. 5d shows a perspective view of the trap of FIG. 5c.

When the bait 3 is consumed or removed, the arms 51 become free to move away from the base of the housing. The bias of the elastic band 5 causes the arms 51 to move upwards relative to the pin 57. As the arms 51 are forced upwards they initially move generally vertically but as the pins 54 reach the transition point of the slots 55 the arms 51 are forced together as shown in FIGS. 5c and 5d.

The force of the elastic band 5 causes the three arms 51 to pivot into the center of the housing. When an animal is present, the arms 51 enclose around the animal with a relatively large force to kill the animal. In this embodiment the elastic band or ring 5 drives a kill mechanism formed by the three arms 51, rather than closing directly on the animal.

The invention is not limited with respect to the embodiments shown in FIGS. 1a-5d. Alternative embodiments are possible in which removal of the bait collapses the support of the band. The bait may be integrated with the support to prevent collapse of the support until it is consumed and/or removed by an animal, such that consumption of the bait by the animal results in collapse of the support.

Preferably, the bait is supported at such a distance from the elastic band that the elastic band contracts around the animal to kill the animal when the trap is triggered by disturbance of the bait. Ideally the elastic band will contract around a part of the body of the animal to block vital blood vessels of the animal, such as the neck area. This distance at which the bait is optimally supported form the band will depend on the animal being targeted. For small rodents such as rats and mice, a suitable distance may be in the range 20 mm-45 mm.

Preferably, the trap is made substantially or entirely from biodegradable materials. The plastic of the housing may be made of any suitable biodegradable material, such as a mouldable blood protein-derived polymer. Other suitable materials may include wood or cornstarch. The elastic band may also be made from biodegradable material, such as latex.

The traps will have a limited life once distributed in a wilderness setting. For example, in some embodiments the biodegradability of the trap components may result in a total functional degradation within three months of deployment in a typical field setting. That is, within three months the trap will become incapable of killing an animal. This may happen through degradation of the rubber ring, the bait or the trap body. However, it is desirable for the trap to retain at least 80% of its mechanical strength for one month after deployment in a typical field setting. Exposure to a typical field setting involves exposure to moisture and to temperatures between 0 and 40 degrees Celsius.

On the other hand, it is desirable for the Applicant's biodegradable traps to have an acceptable shelf life between manufacture and distribution. In preferred embodiments the Applicant's traps may have a shelf life of 6 months to 5 years when stored in a suitable dry storage space at mild temperatures.

Once placed in a field setting exposed to moisture, the Applicant's biodegradable traps will, as noted above, become functionally degraded after a period of time. Within a further period of time the entire trap will break down. In preferred embodiments the entire trap will break down in typical field conditions, exposed to moisture and at 0 to 40 degrees Celsius, within a period in the range 3 months to 3 years, preferably less than 2 years, more preferably less than 1 year.

In urban or domestic applications, the traps may be deployed in dry settings where they will not biodegrade. However, after disposal of the trap once an animal has been trapped (for example in landfill) it will break down over a similar period to that described above.

In some embodiments the traps may be distributed by dropping or propelling (e.g. by catapulting) to a remote location at ground level. The traps may be distributed by dropping them from aircraft. Even if a trap lands with the opening downwards, the trap is lightweight so that animals are able to manoeuvre the trap to face a direction in which they can reach the bait. The total trap weight is preferably less than 100 g, more preferably less than 50 g and most preferably less than 20 g.

In other embodiments (also not shown), an assembly of two or more traps may be provided wherein the two or more traps are connected together to trap two or more animals. For example two traps may be connected end-to-end at the base of the housing of the traps. Many pests (such as rats or possums) are attracted to carcasses, therefore arranging the traps in pairings or groupings is likely to effectively catch multiple pests. Any suitable arrangement of multiple connected traps may be envisaged and the invention is not limited in this respect.

In another embodiment, a trap dispenser may be provided which sequentially dispenses traps as each trap is triggered.

Figure 6B:
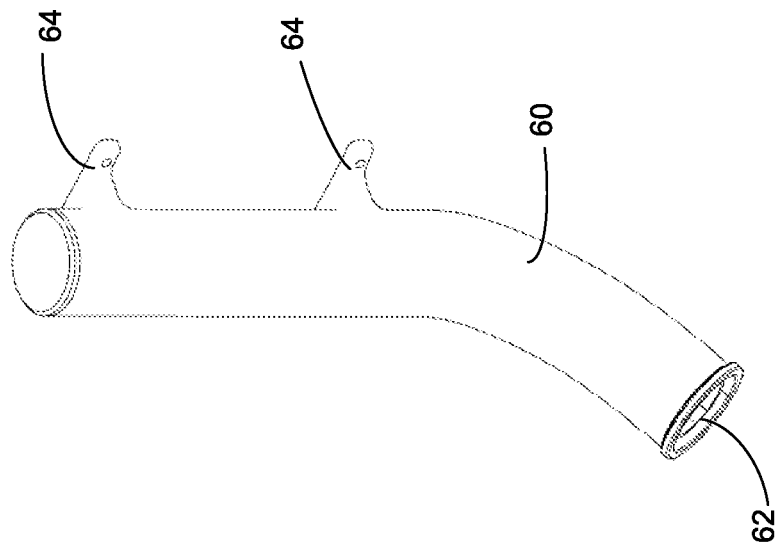
Figure 6A:
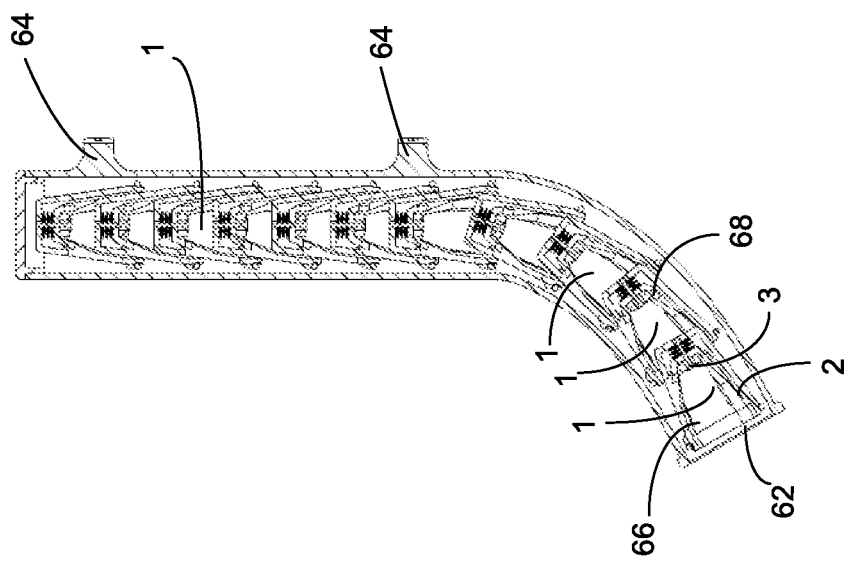
FIG. 6a shows a side cross sectional view of a hopper according to an embodiment of the invention.

FIGS. 6a and 6b show an example of a trap dispenser. The trap dispenser includes a hopper 60, securing means 64, and a number of traps 1 stacked inside the hopper.

The dispenser may be mounted at any suitable height by the securing means to any suitable carrier, for example, it may be fastened to a tree. However the invention is not limited in this respect. In other embodiments, the dispenser may be hung, or it may be resting on the ground.

The hopper may be shaped to allow easier access to the traps and the bait by the animals. In FIG. 6a, the hopper is slightly curved near the bottom for this purpose.

A number of traps may be vertically stacked in the dispenser. The traps may slightly overlap with one another. FIG. 6a shows eleven traps stacked inside the hopper. A pest is able to enter housing of the first trap 66 to access the bait of the first trap 66. The first trap 66 is accessible to an animal, in a trapping position within the dispenser. When the pests accesses the bait, this triggers the trap 66 and releases the elastic band. When the trap is triggered, the elastic band remains attached to the trap and also retains the pest which triggered the trap. The combined weight of the pest and the trap may weigh down the triggered trap enough to cause it to slide/fall from the dispenser, and release the next trap. The next trap is released by gravity, and/or by the movement of the first trap which is connected to the second trap when the traps are overlapped. The next trap therefore moves into the trapping position and becomes accessible to animals.

Figure 7A:
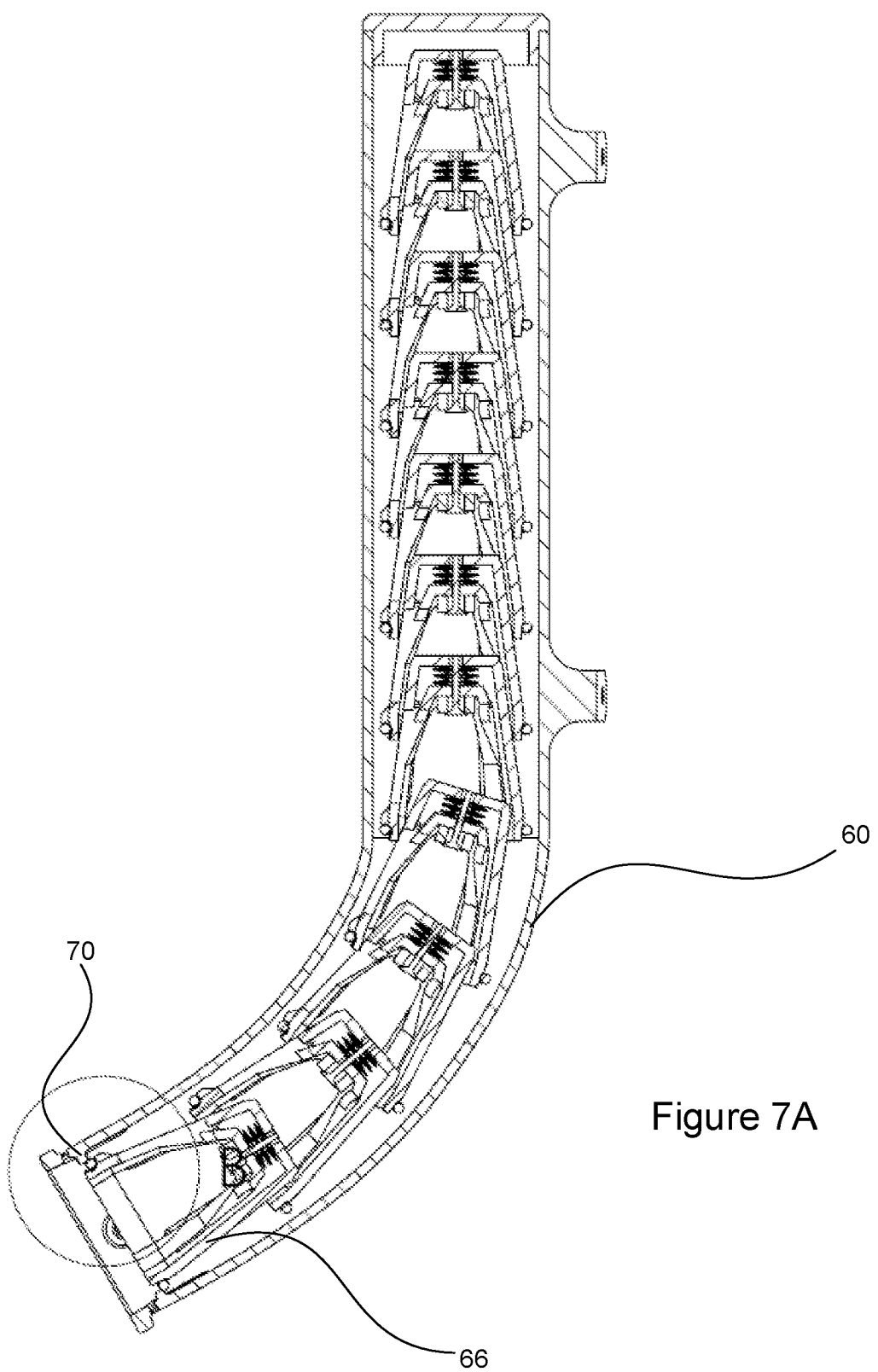
FIG. 7a shows a side cross sectional view of a hopper according to an embodiment of the invention.
Figure 7B:
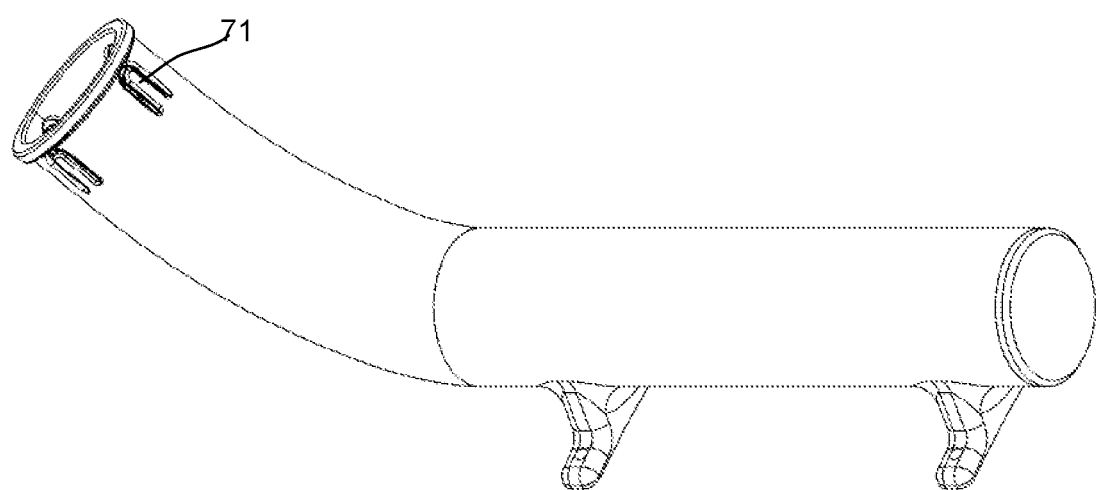
Figure 7C:
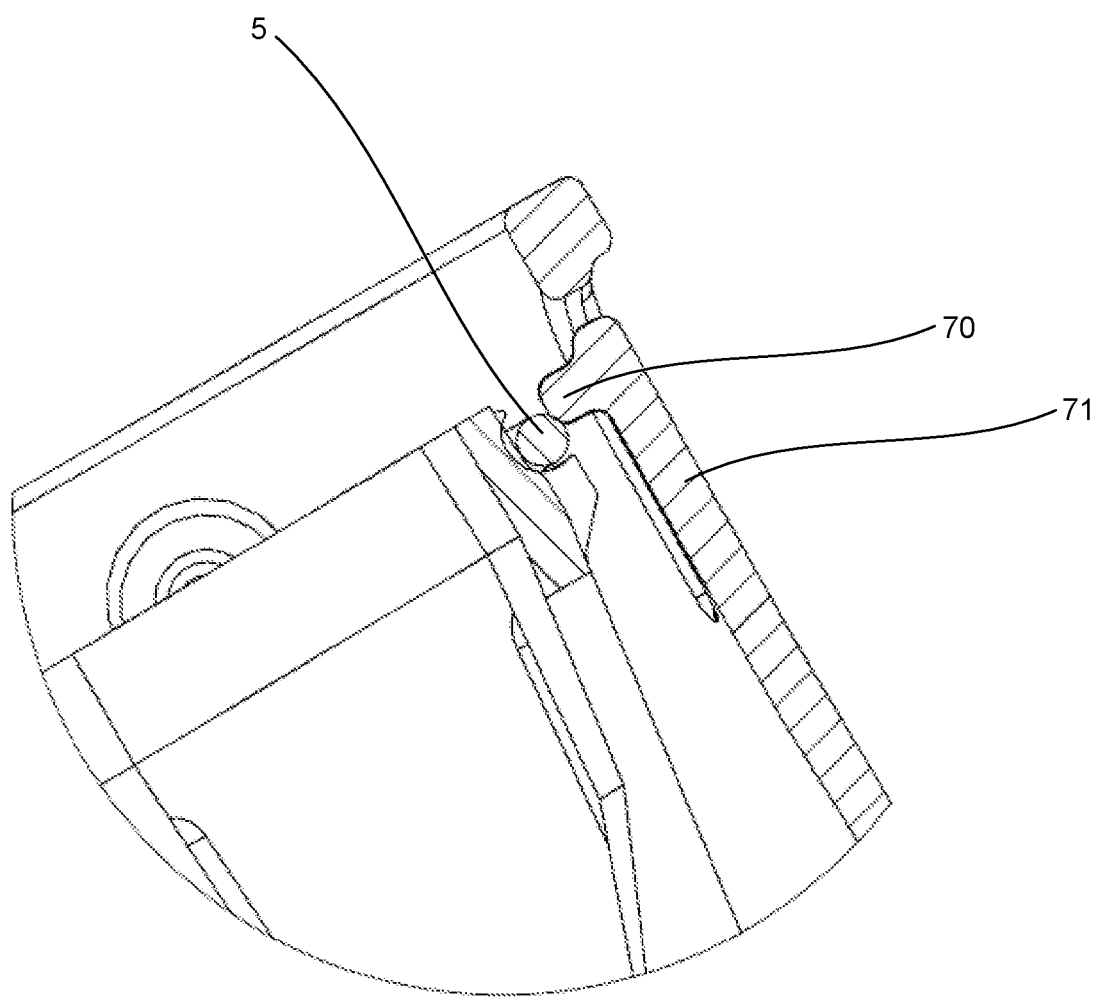

FIGS. 7A to 7D show a further embodiment of trap dispenser. In this embodiment a retention element is provided in the hopper 60. The elastic band 5 of a trap 66 in the trapping position sits against the retention element 70 to maintain that trap 66 in the trapping position. A detailed view of this portion of the trapping system is shown in FIG. 7C. As shown in FIGS. 7B and 7C, the retention element 70 may be provided on a spring element 71 formed by cutting suitable slots in the wall of the housing 60. This allows a small amount of resilience. When an animal is trapped, the trap 66 will be pulled from the housing by forces applied to the trap by the trapped animal. This allows a further trap 1 to slide down in the housing until it reached the retention element 70, when it will be in the trapping position within the dispenser and accessible to an animal.

In some embodiments a part of the trap 1 may withdraw so as to disengage the trap from the retention element when the trap is triggered.

In general the trap housing may be any suitable size and shape to allow a pest to enter the housing to remove or consume or destroy the bait. In the embodiment of FIGS. 1a-1d the housing is cylindrical, whereas in the embodiments of FIGS. 2a-3d the housing is frustoconical in shape. In an unactivated state, the housing is open at one end to allow a pest to enter the housing.

The size of the housing depends on the pest which is being targeted. For rodents such as rats or mice, the housing may have a diameter between 20 mm-40 mm.

In embodiments in which the bait is situated at the base of the housing and the elastic releases near the opening of the housing, the length of the housing is preferably approximately ⅓ that of the body of the pest being targeted. For small rodents, suitable housing may be between 30 mm-60 mm in length.

Preferably, the trap includes one or more drag-inducing features to assist aerial distribution and/or orientation. For improved aerial distribution, the trap may include drag-inducing features such as rotors, wings, or arms. When dropped from heights, such drag-inducing features allow for a wider dispersal of the device, as well as gentler falls to further minimise the risk of unintentional triggering of the traps. In some embodiments the trap housing itself may be shaped to provide drag.

Preferably the trap is configured to land in a position such that the opening does not face upwards. For example, the base of the housing of the traps may be rounded. This minimises the exposure of the interior of the housing, including the bait, to the weather, which lengthens the longevity of the trap. In further embodiments, the traps may include features intended to control orientation of the trap during flight and/or on landing. For example, suitable drag-inducing features, or weight distribution or weight biasing elements may be provided to cause the trap to land with the strongest part of the trap downwards.

The bait may be any suitable bait that is attractive to pests and not to other animals which are not pests. Examples of suitable bait for trapping rodents may include cereal bait, or moulded and extruded protein.

Whether or not the bait includes visual attractants depends on the pest being targeted, but for targeting rodents preferably the bait will lack visual attractants such that other animals which may be attracted by these are not trapped.

The shape of the bait will depend on the trigger mechanism of the trap. As shown in the embodiments of FIGS. 1a-1d and 3a-3d, the bait may be annular in shape, whereas in the embodiment of FIGS. 2a-2d the bait is elongate. The invention is not limited with respect to the shape and/or configuration of the bait.

Preferably the bait is supported at a distance from the elastic band such that the band is well positioned to kill the animal when released. This may be between 20-45 mm for rodents.

Preferably the weight and density of the bait is such that its removal will cause release of the elastic band. The exact weight and density will depend on the trigger arrangement, however in the embodiments shown, weights of between 3-50 grams may be suitable.

The elastic element is preferably made from a highly resilient elastic material such that it can kill a pest in a contracted state. Preferably, the elastic contracts and has a resiliency such that it can kill an animal in as little time as possible, but in any case less than three minutes. The size of the elastic in rodent traps may vary between 6 mm in a collapsed state to 40 mm when strained. Suitable materials may include latex, which also has the benefit that it is biodegradable.

In the embodiments shown the elastic band is circular in a contracted state, though the invention is not limited in this way.

In other embodiments (not shown), the elastic band may be connected to a bag which wraps around the head of the animal when the elastic band contracts. This may speed up the killing of the animal, as not only are the airways of the animal blocked, but the oxygen supply around the head of the animal is also limited, causing suffocation. The result of this faster killing is a more humane trap.

The invention provides an improved animal trap which is relatively humane, environmentally friendly, long-lasting, and easy to manufacture.

The trap is less likely to be falsely triggered, as an animal must consume and/or remove some of the bait in order to trigger the trap. This resilience to triggering allows traps to be safely transported and dispersed from a height. It also prevents other animals which are not pests, humans, or other objects from accidentally triggering the traps.

The fact that the trigger mechanism is the consumption and/or removal of the bait ensures that the pest is in the correct position for being strangled by elastic band.

The trap does not rely on animals contacting or brushing past a trigger mechanism to trigger the trap. This allows the trap to be used by a larger range of animals and animal sizes. In the Applicant's traps, the bait itself forms part of the trigger mechanism.

The housing protects the bait which makes it more long-lasting compared to traps where bait is exposed to the weather etc.

Further, the trap may be substantially or entirely biodegradable.

The simplicity of the trap compared to many prior traps makes it relatively easy to manufacture, and easy to assemble and set.

While the present invention has been illustrated by the description of the embodiments thereof, and while the embodiments have been described in detail, it is not the intention of the Applicant to restrict or in any way limit the scope of the appended claims to such detail. Further, the above embodiments may be implemented individually, or may be combined where compatible. Additional advantages and modifications, including combinations of the above embodiments, will readily appear to those skilled in the art. Therefore, the invention in its broader aspects is not limited to the specific details, representative apparatus and methods, and illustrative examples shown and described. Accordingly, departures may be made from such details without departure from the spirit or scope of the Applicant's general inventive concept.

The invention claimed is:

1. A method of distributing animal traps having a powered kill mechanism that includes an elastic element made of rubber, each in a set state and each including an attractant, a trigger mechanism and the kill mechanism, the method including distributing the animal traps by deploying each animal trap to a remote location at ground level from an aircraft in flight, each animal trap to be accessible to a target species.

2. A method as claimed in claim 1 wherein each trap is configured to remain in the set state under shock loads imposed by landing at the remote location.

3. A method as claimed in claim 1 wherein each trap is configured to be actuated when an animal consumes, removes or destroys the attractant.

4. The method of claim 1 wherein the trap includes one or more drag-inducing features to assist aerial distribution and/or orientation.

5. A method as claimed in claim 1 wherein each animal trap is formed substantially or entirely from biodegradable materials.

6. A method as claimed in claim 5 wherein the kill mechanism includes or is powered by an elastic element made from biodegradable natural rubber.

7. A method as claimed in claim 5 wherein at least part of the trap is formed from a biodegradable mouldable polymer material.

8. A method of distributing animal traps, each in a set state and each including an attractant, a trigger mechanism and a kill mechanism, the kill mechanism including an elastic element made of rubber, the method including distributing the animal traps by deploying each animal trap to a remote location at ground level from an aircraft in flight, each animal trap to be accessible to a target species; wherein the animal traps each have a set state and a triggered state where activation of the trigger mechanism causes the trap to transition from the set state to the triggered state.

9. A method as claimed in claim 8 wherein each trap is configured to remain in the set state under shock loads imposed by landing at the remote location.

10. A method as claimed in claim 8 wherein each trap is configured to be actuated when an animal consumes, removes or destroys the attractant.

11. The method of claim 8 wherein the trap includes one or more drag-inducing features to assist aerial distribution and/or orientation.

12. A method as claimed in claim 8 wherein each animal trap is formed substantially or entirely from biodegradable materials.

13. A method as claimed in claim 12 wherein the kill mechanism includes or is powered by an elastic element made from biodegradable natural rubber.

14. A method as claimed in claim 12 wherein at least part of the trap is formed from a biodegradable mouldable polymer material.

* * * * *